United States Patent
Bosg et al.

(10) Patent No.: US 9,855,683 B2
(45) Date of Patent: Jan. 2, 2018

(54) FLOOR MADE FROM PLASTIC MATERIAL FOR A MOTOR VEHICLE WITH METAL FITTING INSERTS

(71) Applicants: Patrick Bosg, Saint Bartelemy de Vals (FR); Jean-Yves Sozet, Vion (FR)

(72) Inventors: Patrick Bosg, Saint Bartelemy de Vals (FR); Jean-Yves Sozet, Vion (FR)

(73) Assignee: Compagnie Plastic Omnium, Lyons (FR)

( * ) Notice: Subject to any disclaimer, the term of this patent is extended or adjusted under 35 U.S.C. 154(b) by 60 days.

(21) Appl. No.: 14/655,425

(22) PCT Filed: Dec. 27, 2013

(86) PCT No.: PCT/FR2013/053269
§ 371 (c)(1),
(2) Date: Jun. 25, 2015

(87) PCT Pub. No.: WO2014/102509
PCT Pub. Date: Jul. 3, 2014

(65) Prior Publication Data
US 2015/0353145 A1    Dec. 10, 2015

(30) Foreign Application Priority Data
Dec. 28, 2012 (FR) ........................ 1262949

(51) Int. Cl.
*B29C 33/14*    (2006.01)
*B29C 43/18*    (2006.01)
(Continued)

(52) U.S. Cl.
CPC .............. *B29C 33/14* (2013.01); *B29C 43/18* (2013.01); *B29C 43/40* (2013.01); *B29C 70/72* (2013.01);
(Continued)

(58) Field of Classification Search
CPC .......... B29C 33/14; B29C 43/18; B29C 70/72
(Continued)

(56) References Cited

U.S. PATENT DOCUMENTS 2,256,769 A * 9/1941 Amrine ................. B29C 33/123
                                                                   16/431
2,304,984 A * 12/1942 Wood ....................... G02B 7/02
                                                                   249/91

(Continued)

FOREIGN PATENT DOCUMENTS

CN        102131623 A       7/2011
DE      102005013526 A1    9/2006
(Continued)

OTHER PUBLICATIONS

Database WPI 1.11; Week 198812; Thomson Scientific. London. GB; AN 1988-079724; XP002714232. Abstract of JPS5954527A dated Sep. 1982.
(Continued)

*Primary Examiner* — Roberts B Davis
(74) *Attorney, Agent, or Firm* — Jacox, Meckstroth & Jenkins

(57) ABSTRACT

A mold for producing a floor made from a polymer material for a motor vehicle, comprising at least one metal insert in the form of sheet metal that is partially overmolded, i.e. having a portion intended to be covered with polymer material and a portion intended to not be covered in this way, the mold comprising a die and a punch defining a cavity, the cavity comprising a location intended to receive the portion of a metal insert intended to be covered with polymer material, wherein the mold, in this location of the cavity, comprises gadroons on the die and on the punch, the
(Continued)

gadroons having a thickness that is greater than a predefined minimum thickness (H). The invention also concerns a floor obtained by this method.

20 Claims, 5 Drawing Sheets

(51) Int. Cl.
*B29C 70/72* (2006.01)
*B29C 43/40* (2006.01)
*B62D 25/20* (2006.01)
*B62D 29/00* (2006.01)
*B29L 31/30* (2006.01)

(52) U.S. Cl.
CPC .......... B62D 25/20 (2013.01); B62D 29/004 (2013.01); *B29L 2031/3002* (2013.01)

(58) Field of Classification Search
USPC ........................................... 249/91
See application file for complete search history.

(56) References Cited

U.S. PATENT DOCUMENTS

| | | | | |
|---|---|---|---|---|
| 4,071,938 A | * | 2/1978 | Chambers | A63C 1/42 264/237 |
| 4,336,009 A | * | 6/1982 | Wolf | B29C 45/14418 249/83 |
| 4,381,908 A | * | 5/1983 | Roth | B29C 33/123 249/91 |
| 4,952,130 A | * | 8/1990 | Reil | B29C 45/14598 249/175 |
| 5,527,052 A | * | 6/1996 | Litin | B62B 1/264 141/88 |
| 5,575,056 A | * | 11/1996 | Nakagawa | B29C 33/14 29/460 |
| 2008/0179772 A1 | | 7/2008 | Dichtl et al. | |
| 2015/0336304 A1 | | 11/2015 | Bosg et al. | |

FOREIGN PATENT DOCUMENTS

| | | |
|---|---|---|
| DE | 102010016687 A1 | 11/2011 |
| EP | 2468481 A2 | 6/2012 |
| FR | 2915129 A1 | 10/2008 |
| JP | S5954527 | 3/1984 |
| JP | 2008279935 | 11/2008 |
| WO | 2014/006276 A1 | 1/2014 |

OTHER PUBLICATIONS

Database WPI 1.11; Week 200882; Thomson Scientific. London. GB; AN 2008-010627; XP002714233. Abstract of JP2008279935A date Nov. 2008.

* cited by examiner

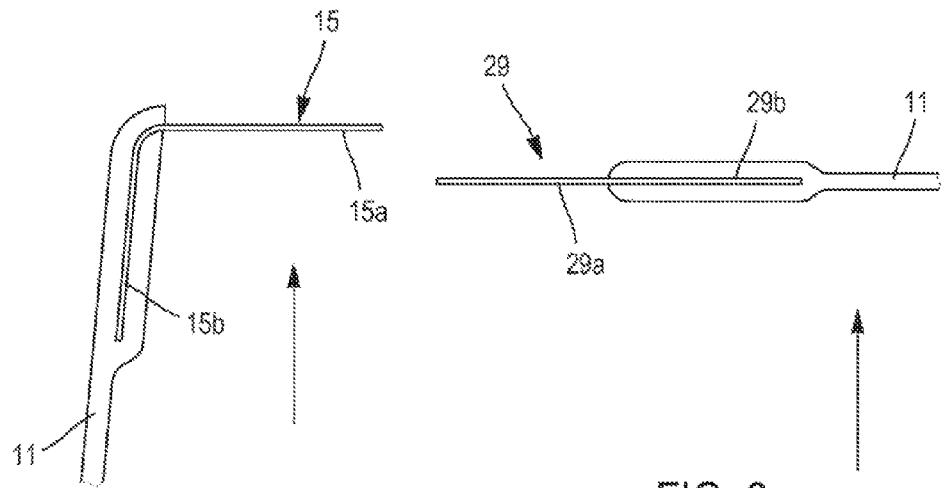
FIG. 8
FIG. 9
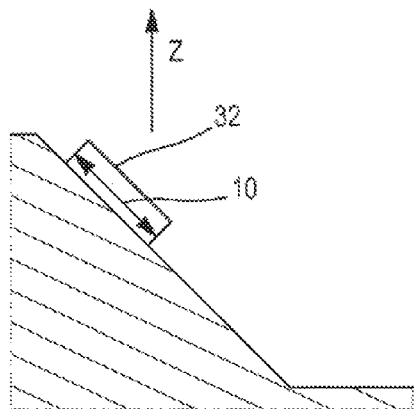
FIG. 10
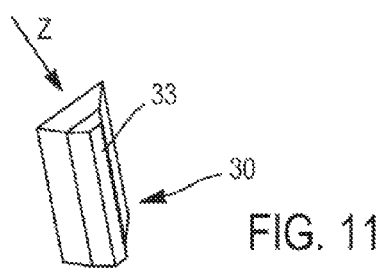
FIG. 11

FLOOR MADE FROM PLASTIC MATERIAL FOR A MOTOR VEHICLE WITH METAL FITTING INSERTS

CROSS-REFERENCE TO RELATED APPLICATIONS

This application is the U.S. National Phase application of PCT Application No. PCT/FR2013/053269 filed Dec. 27, 2013, which claims priority to the French application 1262949 filed on Dec. 28, 2012, which applications are incorporated herein by reference and made a part hereof.

FIELD OF THE INVENTION

This invention relates to the technical field of plastic floors for motor vehicles.

DESCRIPTION OF THE RELATED ART

The manufacture of a motor vehicle starts by a step of metalworking, which consists in producing a body in white, by welding together various metal parts, body which is then immersed in a cataphoresis bath to treat the surfaces of the metal parts and the spot welds against corrosion.

After the cataphoresis stage, the body undergoes various assembly and painting steps until a complete vehicle is obtained.

It is known that the use of plastic parts in the constitution of a vehicle is a success factor in the search to reduce fuel consumption, thanks to the weight reduction obtained by replacing a metal part by a lighter plastic part.

However, the existence of already operational assembly lines organized in the order indicated above, namely first metalworking and cataphoresis, followed by painting and assembly, makes it difficult, even financially impossible, to develop the vehicle manufacturing processes in which this order is not respected.

It is therefore to comply with the existing assembly lines that the manufacture of plastic parts with metal inserts to be welded to other metal parts during the metalworking step has already been proposed. In particular, document FR2915129 discloses a motor vehicle floor having inserts partially overmolded in a layer of AMC (Advanced Molding Compound), BMC (Bulk Molding Compound) or SMC (Sheet Molding Compound), a thermosetting material particularly suited to this application due to its mechanical strength and its ability to undergo the cataphoresis step without degrading. The inserts comprise areas not covered by the plastic material, on which welding can be carried out, in order to assemble the floor with other metal parts during the metalworking.

One of the difficulties that arise during the manufacture of a plastic floor fitted with overmolded welding inserts is that good mechanical continuity must be guaranteed between the welding inserts and the rest of the floor.

The invention aims to overcome this difficulty.

SUMMARY OF THE INVENTION

To this end, the invention relates to a mold for producing a floor made from a polymer material for a motor vehicle, comprising at least one metal insert in the form of sheet metal that is partially overmolded, i.e. having a portion intended to be covered with polymer material and a portion intended to not be covered in this way, the mold comprising a die and a punch defining a cavity, the cavity comprising a location intended to receive the portion of a metal insert intended to be covered with polymer material, wherein in this location of the cavity, the mold comprises gadroons on the die and on the punch, the gadroons having a thickness that is greater than a predefined minimum thickness (H).

Preferably, the gadroons are integral with the mold. They are formed integrally with the inner wall of the die or the punch.

The thickness (H) is determined, for a given polymer material, as being the minimum thickness of polymer material with which the insert must be covered so that the floor is robust, i.e. so that it complies with the specifications of the mechanical stresses that have been defined during its design, in view of its intended use.

In a preferred embodiment, the thickness (H) is greater than or equal to 1 mm, preferably between 2 mm and 4 mm.

Thanks to the invention, the gadroons prevent the sheet metal from being too close to the punch and the die, therefore to the outer faces of the floor. Thus, there is enough plastic material on each side of the sheet metal to guarantee good mechanical continuity between the inserts and the rest of the floor.

Optimally, the gadroons have the same height on the punch and on the die, in order to hold the insert in the middle of the plastic material thickness around the insert.

Another difficulty lies in the fact that the formation of thin layers of plastic near the gadroons must be avoided. In fact, thin layers of plastic material left on the surface of the inserts may become detached during the cataphoresis, which would lead to pollution of the cataphoresis bath.

In order to overcome this additional disadvantage, according to one embodiment of the invention, each gadroon is dimensioned to come into contact with the insert by its free end, after closing the mould, and this free end by which the gadroon comes into contact with the insert is shaped to prevent the plastic material from covering the sheet metal at said end. The quality of this contact depends in particular on the pressure applied by the ends of the gadroons against the inserts, this pressure depending itself directly on the mould closing force and the orientation of the gadroons.

In order to overcome this additional disadvantage, according to one embodiment of the invention, each gadroon is dimensioned to come into contact with the insert by its free end, after closing the mold, and this free end by which the gadroon comes into contact with the insert is shaped to prevent the plastic material from covering the sheet metal at the end. The quality of this contact depends in particular on the pressure applied by the ends of the gadroons against the inserts, this pressure depending itself directly on the mold closing force and the orientation of the gadroons.

As a variant, the free end by which the gadroon comes into contact with the insert is shaped so that if there is a material infiltration between the end and the insert, the material is not likely to detach in the various situations that the floor will encounter during its life.

The insert is therefore clamped between the gadroons, which can be opposite one another or offset. The choice between these two possibilities (gadroons opposite each other or offset) depends in particular on the thickness of the insert and especially on its stiffness, if it is to be prevented from buckling between its support if the gadroons are offset.

Thus, no thin layer of plastic material can form on the uncovered parts of the inserts.

In a special embodiment, the gadroons are mainly distributed in a repetitive arrangement, for molding under a pressure of 100 bars, with inserts made from sheet steel metal for bodywork of type DC04+ZE according to standard NF EN 10152 (XES quality index according to the former standard NF 36-401), the sheet metal thickness being between 0.7 mm and 2 mm, preferably between 0.5 mm and 0.8 mm, the length of the pattern being comprised between 20 mm and 100 mm, preferably between 20 mm and 55 mm. These various values, although presented together, may be separated from each other to form separate and independent characteristics.

The term "mainly" is taken to mean the fact that more than half the gadroons are arranged in the repetitive arrangement.

The technical effect of the repetitive arrangement is to hold the sheet metal in position over its entire length.

The length of the repetitive arrangement is defined according to the molding pressure, the material and thickness of the sheet metal and the mold closing direction.

In another special embodiment, on a portion of the overmolded metal insert, which extends in a direction not perpendicular to the mold closing direction, each arrangement comprises three gadroons, two being close together, and the distance between these two close gadroons is from 10 mm to 15 mm.

Advantageously, the gadroons are shaped to facilitate demolding of the floor.

For example, for a portion of the overmolded metal insert extending not perpendicularly to the mold closing direction, the contact end of the gadroon has a substantially trapezoidal shape, with a base of 1 mm to 2 mm and a draft angle of 1 degree to 3 degrees.

However, for another portion of the overmolded insert extending perpendicular to the mold closing direction, the contact end of the gadroon may have a rectangular shape, due to the fact that demolding is carried out in the direction perpendicular to the contact surface.

Finally, the invention relates to a floor made from polymer material for a motor vehicle, comprising at least one metal insert in the form of sheet metal that is partially, overmolded, wherein it comprises, in the thickness of the polymer material, at least one opening leading to the insert.

This or these opening(s) correspond to the locations of the gadroons which are in contact with the inserts during overmolding.

In one embodiment, the plastic floor has a thickness of 2 mm to 5 mm and comprises at least one partially overmolded insert in the form of sheet steel metal for bodywork of type DC04+ZE according to standard NF EN 10152 (XES quality index according to the former standard NF 36-401), of thickness from 0.7 mm to 2 mm.

According to the invention, the term "polymer" designates both homopolymers and copolymers (in particular binary or ternary). Homopolymers are linear or branched polymers of the same monomer. Some non-limiting examples of copolymers are as follows: random copolymers, alternating copolymers, block copolymers and graft copolymers.

A mixture of polymers or copolymers may also be used, as well as a mixture of polymer materials with inorganic, organic and/or natural fillers such as, for example, but not limited to: carbon, salts and other inorganic derivatives, natural or polymer fibers. It is also possible to use multilayer structures consisting of stacked layers bonded together comprising at least one of the polymers or copolymers described above.

One polymer often used is polyester, especially in a bulk (BMC or AMC) or sheet (SMC) molding compound.

These and other objects and advantages of the invention will be apparent from the following description, the accompanying drawings and the appended claims.

BRIEF DESCRIPTION OF THE ACCOMPANYING DRAWINGS

It will be easier to understand the invention on reading the description below, given as an example and referring to the drawings, on which:

FIG. 8 is a sectional view along VIII-VIII of FIG. 7;

FIG. 9 is a sectional view along IX-IX of FIG. 7;

FIG. 10 is a close-up view of portion X of drawing of FIG. 1;

FIG. 11 is a perspective view of a rear gadroon of the mold;

DETAILED DESCRIPTION OF THE PREFERRED EMBODIMENTS

We now refer to FIGS. 1A-1F, which includes six drawings (FIGS. 1A, 1B, 1C, 1D, 1E and 1F) representing a two-part mold during six successive steps of a method for manufacturing a part made from polymer material.

The mold is mounted on a press (not shown) having a fixed platen 1 and a movable platen 3.

The mold comprises a die 5 which is mounted on the fixed platen 1 of the press, and a punch 7, mounted on the movable platen 3. The die is the female (concave) half of the mold, while the punch is its male (convex) half.

Figure 1A:
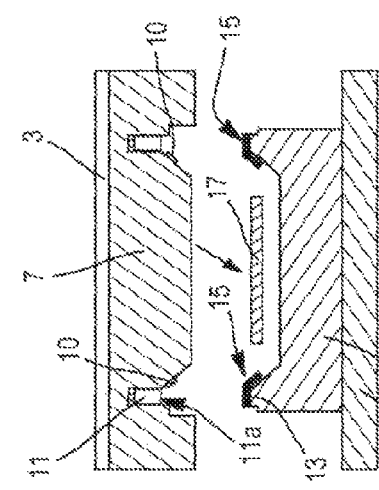
FIGS. 1A-1F are a set of six drawings showing a mold in an implementation of the method according to the invention.
Figure 1B:
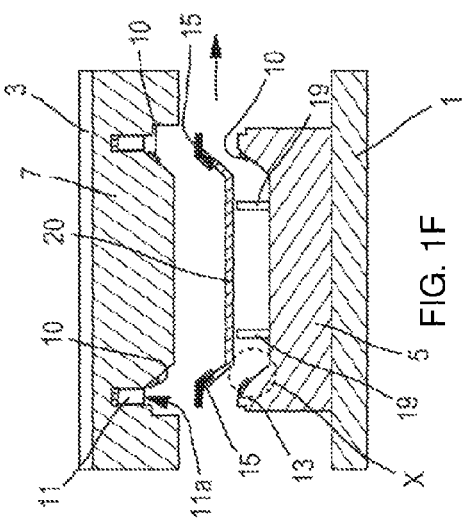
Figure 1C:
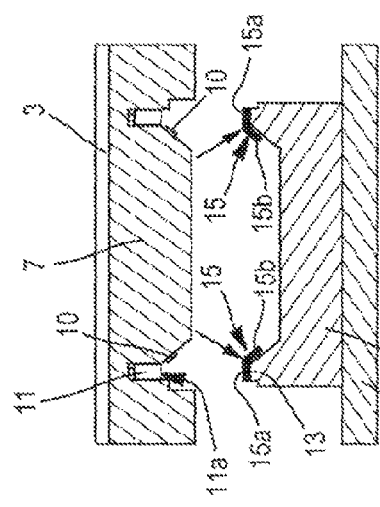
Figure 1D:
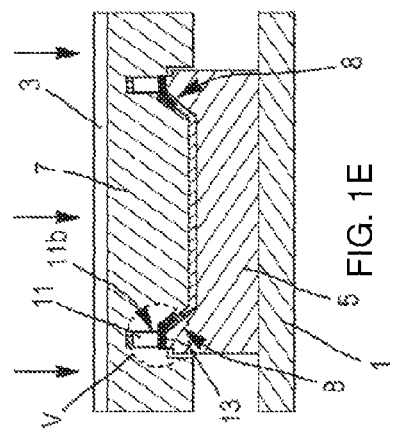

The mold is of the compression chamber type, which means that during its closing movement from its open position (FIGS. 1A, 1B, 1C and 1D), there comes a point where the mold cavity is a closed space 9, as shown in FIG. 1D. At this time, the mold is in a closed filling position. The volume of the space 9 is of course greater than that of the mold cavity, which is defined when the mold has reached the molding position, and which corresponds to the finished part. During all the closed filling positions and until the molding position (FIG. 1E), the punch 7 slides like a piston along a surface defining a compression chamber. The sealing of the mold with respect to the material flowing in the mold to produce the finished part is in principle provided at the compression chamber.

In the case of the mold of FIGS. 1A, 1B, 1C, 1D, 1E and 1F, the surface delimiting the compression chamber is created by a peripheral movable block 11, which can take a retracted position (FIG. 1A) in the movable part 3 of the press and an advanced position (FIG. 1D). This movable block 11, which, although drawn as a single piece may consist of several pieces, performs two functions.

Firstly, by its inner face 11b, it forms the above-mentioned surface against which the punch 7 slides. To this end, a gap (not shown) is left between the inner surface 11b of the movable block 11 and the punch 7. This gap also acts as a vent, allowing gases trapped in the cavity to escape while the mold is being filled with the polymer material.

Secondly, by its lower face 11$a$, the block 11 forms, with a blocking area having a face 13 provided on the die 5, opposite the face 11$a$ of the movable block 11, a means of blocking one or more inserts which will be described later. The movable block 11 is made in a single piece with a frame which is mounted on rams 12 carried by the punch 7 in order to move up to the blocking area 13 before the punch 7 engages by sliding in the compression chamber. In a variant not shown, the block 11 is a part separate from the frame, mounted on the lower side of the frame.

Figure 2:
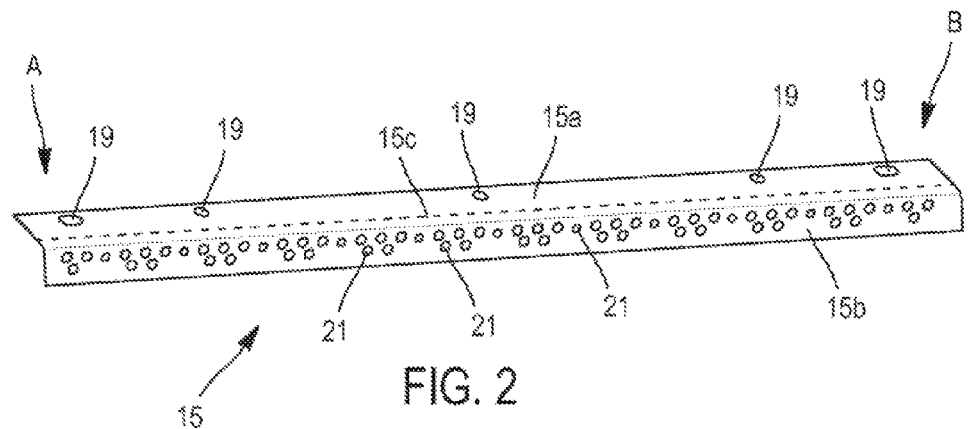
FIG. 2 is a perspective view of a lateral insert of a floor.
Figure 3:
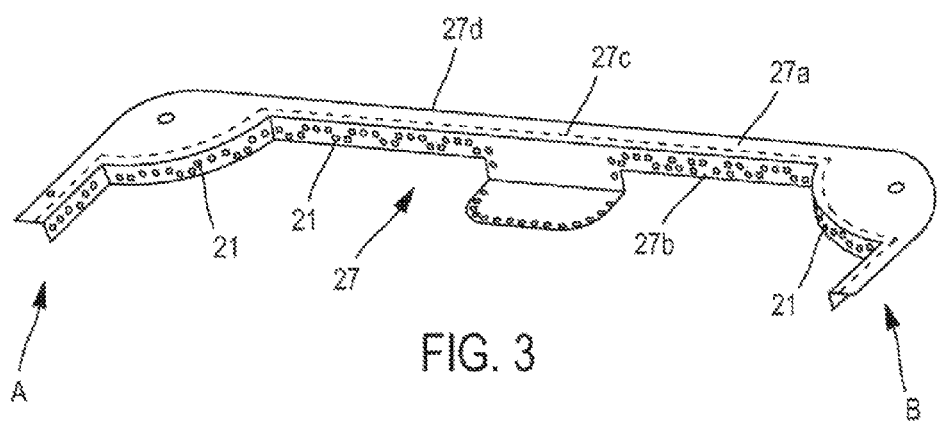
FIG. 3 is a perspective view of a front insert of a floor.
Figure 4:
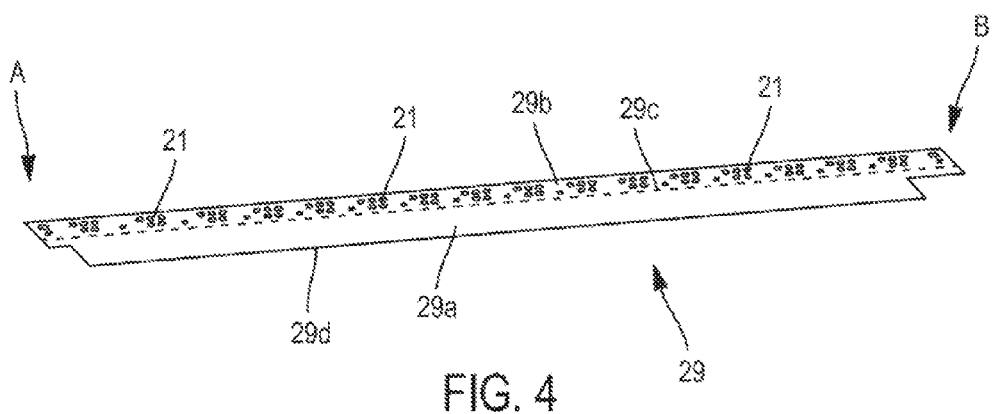
FIG. 4 is a perspective view of a rear insert of the floor of FIG. 9.

The perspective views of FIGS. 2, 3 and 4 show respectively lateral 15, front 29 and rear 27 metal inserts, which are adapted to be placed in the mold in open position. Each insert has an elongated shape which is rectilinear for the lateral 15 and rear 29 inserts of FIGS. 2 and 4, and non-rectilinear for the front insert 27 of FIG. 3.

As shown in FIG. 1B, the lateral insert 15 is positioned on the die 5 so that a portion 15$a$ of the insert covers face 13 of the blocking area and so that a portion 15$b$ of the insert is housed in the mold cavity. The portion 15$b$ housed in the mold cavity is a part of the insert 15 which is to be overmolded. The portion of each insert which is to be overmolded will be designated the "overmolded portion". The portion 15$a$ covering the face 13 is a part which is intended to protrude from the molded part. This latter portion 15$a$ of the insert 15 will be designated the "uncovered portion". As shown on FIG. 2, the boundary 15$c$, called the overmolding limit, between portion 15$b$ intended to be overmolded and uncovered portion 15$a$, is an imaginary line schematized by a dashed line on FIG. 2. The same overmolding limit 27$c$ exists between the uncovered 27$a$ and overmolded 27$b$ portions of the front insert 27. The same applies with the overmolding limit 29$c$ of the rear insert 29 between its uncovered portion 29$a$ and its overmolded portion 29$c$, as shown on FIGS. 3 and 4.

The overmolding limits 15$c$, 27$c$ and 29$c$ extend from a first end A of each insert to an opposite end B of the insert, without leaving the insert and following approximately its edge 15$d$, 27$d$, 29$d$ which is not necessarily rectilinear.

Each of the inserts has special contours which are specific to the floor model to be obtained. Similarly, each insert has a transverse cross-section bent at a special angle which may be different from one insert to another or from one location to another over the length of a given insert. These shape characteristics of the inserts will not be described in detail in this description.

In the overmolded portions 15$b$, 27$b$, 29$b$, each insert 15, 27, 29 comprises attachment holes 21 intended to be filled by the plastic material to hold the sheet metal securely, as is known by those skilled in the art. In the portion 15$a$, the lateral insert 15 comprises centering holes 19 to center it in the direction of its length, i.e. the X direction (see FIG. 2).

When an insert 15 is positioned in the mold with its uncovered portion 15$a$ between the block 11 and the blocking surface 13, the overmolded portion 15$b$ of the insert 15 is in the mold cavity at a position 8 (FIG. 1E) which, in this example, is on the periphery of the cavity.

While FIGS. 1A-1F represents only the insert 15, the related explanations are also valid for inserts 27 and 29.

In the position 8, the mold comprises lateral 10 (FIG. 10), front (not shown) and rear 30 (see FIG. 11) gadroons on the die 5 and on the punch 7 or the block 11. The gadroons 10, 30 are integral shapes of the mold, formed integrally with the inner wall of the die 5 or the punch 7. The gadroons 10, 30 are arranged to come into contact with the inserts 15 on either side, in order to hold them in a predetermined position while molding the floor, away from the walls of the cavity.

Each gadroon 10, 30, is dimensioned to come into contact with the insert 15, 27, 29 by its free end 32, 33 (FIG. 11), after closing the mold, and the free end 32, 33 coming into contact with the corresponding insert is shaped to prevent the plastic material 11 from covering the sheet metal at the free end 32, 33.

The perspective view of FIG. 11 shows the rear gadroon 30 in detail. The rear gadroon 30 is shaped to facilitate demolding of the floor along the Z direction. In this example, the free end 33 of the gadroon (intended to come into contact with the insert) has a substantially trapezoidal shape whose width increases along the demolding direction Z, with a base e of 1 mm to 2 mm, a draft angle of 1 degree to 3 degrees along the length L of 25 mm and an overmolding thickness H of 2 mm.

Figure 6:
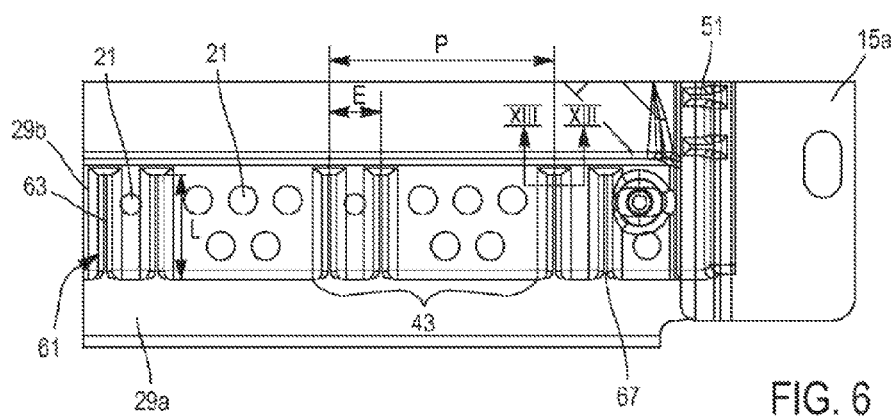
FIG. 6 is a view along VI of a portion of the floor of FIG. 7.

As shown in FIG. 6, the rear gadroons 30 are mainly distributed in a repetitive arrangement 43, for molding under a pressure of 100 bars, with inserts made from sheet steel metal of type XES (Standard NF 36-401), the thickness of the sheet metal being 0.67 mm. The length P of the pattern is 50 mm.

Each arrangement 43 comprises three gadroons 30, two being close together, the distance E between these two close gadroons being 10 mm.

The lateral gadroons 10 are shaped to facilitate demolding of the floor along the Z direction. In this example, the contact end 33 of the gadroon 10 has a substantially rectangular shape whose overmolding length L is 25 mm and the width is 1 mm to 2 mm (preferably 1 mm). Its thickness H is 2 mm.

Figure 5:
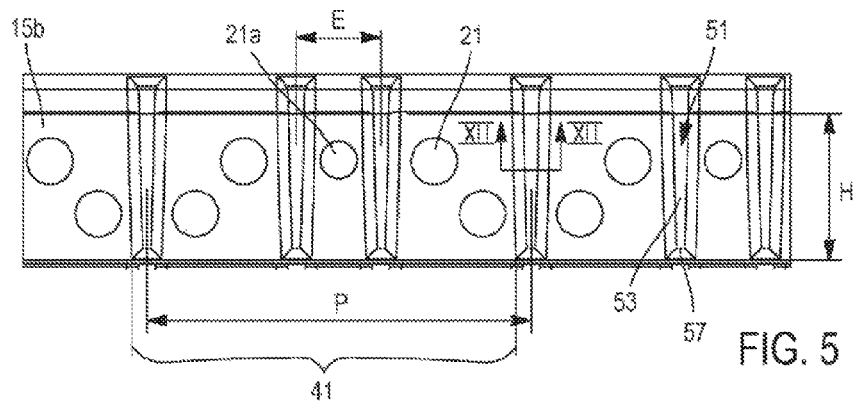
FIG. 5 is a view along V of a portion of a floor.

As shown in FIG. 5, the lateral gadroons 10 are mainly distributed in a repetitive arrangement 41, for molding under a pressure of 100 bars, with inserts made from sheet steel metal of type XES (Standard NF 36-401), the thickness of the sheet metal being 0.67 mm. The length P of the pattern is 50 mm.

Each arrangement 41 comprises two gadroons 10, the distance between these two gadroons 10 being from 10 mm to 15 mm.

The material used for molding is a thermosetting plastic of type SMC (sheet molding compound). It is deposited in the open mold, on the die 5, substantially in the middle of the cavity although this is not a necessity, as a blank 17, as is known. The step of depositing the material in the mold in open position is illustrated by FIG. 1C.

Referring to FIGS. 1A-1F, we will now describe six successive steps of the molding method according to the invention.

In a first step, illustrated by FIG. 1A, the mold is in open position: the punch 7 is far away from the die 5 and the movable block 11 is retracted in the punch 7.

In a second step, illustrated by FIG. 1B, the front 17, lateral 15 and rear 29 inserts are positioned on the blocking area 13 of the die 5, with their overmolded portions 15$b$, 27$b$ and 29$b$ housed in position 8 of the cavity and resting on the gadroons 10, 30 of the die 5.

In a third step, illustrated by FIG. 1C, an SMC sheet 17 is deposited in the middle of the cavity, on the die 5. The second and third steps may be combined or performed in a different order.

In a fourth step, not shown, the movable part 3 is brought close to the fixed part 1, but without closing the mold, in other words without any of the parts of the upper half of the mold, namely the punch 7 and the movable block 11, touching one of the parts of the lower half of the mold, namely the die 5. The mold has therefore not yet reached its closed filling positions.

In a fifth step, the rams 12 are actuated to lower the movable block 11 towards the blocking area 13 of the die, as illustrated by FIG. 1D. In so doing, face 11a of the movable block 11 moves against the uncovered portions 15a, 27a and 29a of the front 17, lateral 15 and rear 29 inserts, firmly blocking them in position against face 13 of the blocking area.

Thus positioned, the movable block 11 performs its two functions: firstly, it holds the inserts in position ready to fill the mold cavity by flowing of the material 17, and secondly it forms a compression chamber. The mold cavity, delimited by the punch 7, the movable block 11 and the die 5, is therefore closed, but does not yet define the shape of the part to be obtained. The mold is in closed filling position.

Figure 1E:
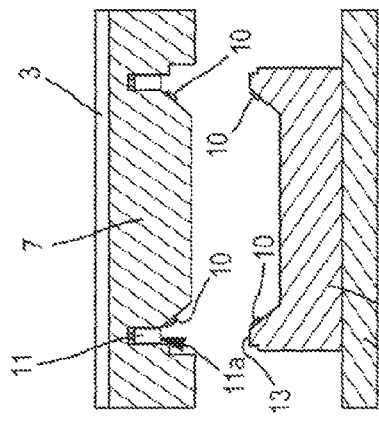

In a sixth step, illustrated by FIG. 1E, the movable part 3 of the press continues its path towards the fixed part 1. In so doing, the punch 7 continues its movement by sliding like a piston in the block 11. The block 11 remains stationary resting against the inserts 15, while the rams 12 move back without reducing the pressure holding the inserts. The inner face 11b of the movable block 11 forms the lateral wall of the compression chamber against which the punch 7 slides. Due to the reduction in cavity volume and the molten state of the plastic material 17, the plastic material 17 flows into the mold cavity filling it completely, in particular covering portions 15b, 27b and 29b of the inserts 15, 27, 29 which are housed in position 8 of the mold cavity. When the punch 7 has stopped moving, the gadroons 10, 30 of the punch have come into in contact with the overmolded portions 15b, 27b, 29b of the inserts and the mold is in the molding position. The plastic material 17 has completely filled the mold cavity, but has been prevented by the gadroons 10, 30 from coming into contact at their positions with the overmolded portions 15b, 27b, 29b of the inserts. Since the block 11 is separated from the punch 7 by the rams 12, the pressure of the block 11 on the uncovered portions 15a, 27a, 29a of the inserts 15, 27, 29 is not disturbed by the pressure of the gadroons 10, 30 on the overmolded portions 15b, 27b, 29b of the inserts. In other words, no hyperstatism occurs.

The volume of the cavity between the punch 7, the movable block 11 and the die 5 is that of the finished part.

Figure 1F:
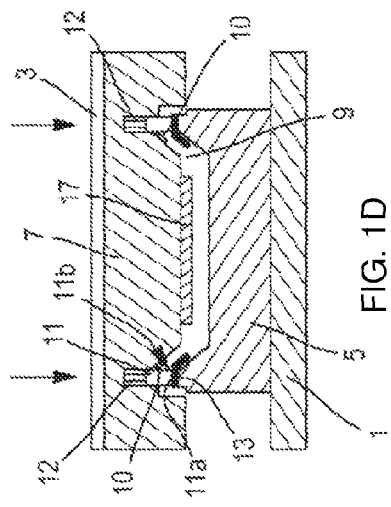

In a seventh step, illustrated by FIG. 1F, the movable part 3 of the press starts to move in the mold opening direction. This time the movable block 11 remains fastened to the punch 7 and rises up with it, thereby returning the mold to the fully open position. Ejectors 19, provided in the die 5, raise the molded floor 20. The latter is then released and the ejectors 19 retracted, in order to start a molding cycle from the step illustrated by drawing FIG. 1A.

Since the molding direction is vertical, i.e. in the Z direction, we see that that overmolded portions 15b, 27b of the lateral 15 and front 27 inserts are not perpendicular to the molding direction, while the overmolded portion 29b of the rear insert 29 is horizontal, i.e. perpendicular to the molding direction. This can be seen more clearly in FIGS. 8 and 9, illustrating respectively a sectional view of the lateral insert 15 and of the rear insert 29.

In another embodiment example not shown, the inserts are inclined relative to the molding direction.

The thickness of the sheet metal of the inserts is from 0.7 mm to 2 mm and the thickness H of the plastic material is from 2 mm to 5 mm.

Figure 7:
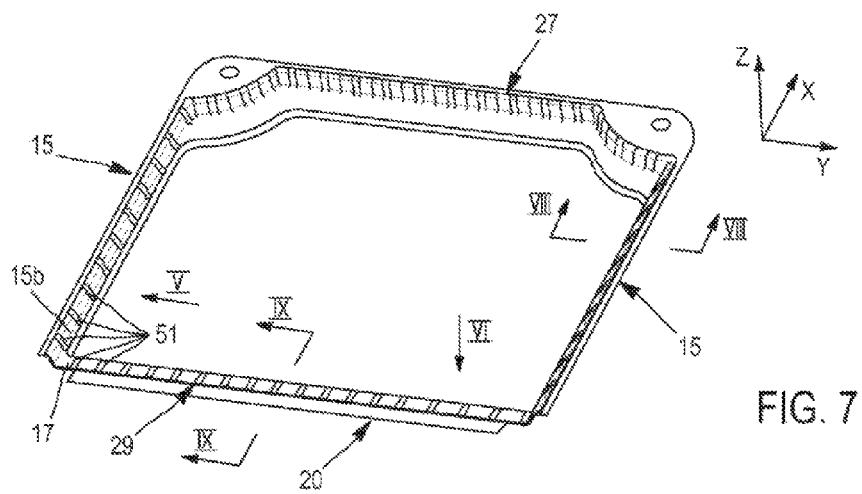
FIG. 7 is a perspective view of a floor produced by molding using the inserts of FIGS. 2 to 4.

FIGS. 5 and 7 show the overmolded portion 15b in dotted lines, covered by the plastic material 17. Notches 51 are formed in the plastic material 17 by the gadroons 10 of the mold. In other words, the floor 20 has openings (notches 51) leading to the inserts, in the thickness of the plastic material 17.

We can understand that the shape of a notch is complementary to the shape of a gadroon.

Thus, as shown on FIG. 5, in each area 53 of the overmolded portion 15b which has a notch 51 complementary to a gadroon 10, the insert 15 is not covered by the plastic material. Each area 53 extends over the entire flat section of the overmolded portion 15b of the insert, but stops in the rounded area of the insert which leads to its uncovered portion 15a. In other words, between the flat section of the overmolded portion 15b and up to the overmolding limit 15c, the rounded area of the insert is covered with plastic material 52, although the gadroon is located here.

To ensure that the plastic material 52 does not detach from the rest of the floor during the lifetime of the floor, the free end 32 of the gadroon 10 may be provided with a recess which, at the boundary between the area 53 and the plastic material 52, clearly separates the free end 32 from the rounded area of the insert, so that the plastic material layer 52 is sufficiently thick and therefore strong.

The diameters of the attachment holes 21 may vary from 4 mm to 10 mm. Preferably, the diameter of the attachment holes 21a which are located between the two close gadroons 10a and 10b is 5 mm. The diameter of the other attachment holes is 6 mm. The distance between each close gadroon 10a or 10b and its neighboring gadroon is 19 mm.

FIG. 6 shows the overmolded portion 29b and the non-overmolded portion 29a of the rear insert 29. The over-molded portion 29b is covered by the plastic material 17, except in each area 63 of the overmolded portion 29b where there is a notch 61 complementary to a gadroon 30. The notches 61 are formed by the rear gadroons 30 of mold which are distributed in the repetitive arrangement 43.

The diameters of the attachment holes 21 may vary from 4 mm to 10 mm. Preferably, the diameter of the attachment holes 21a which are located between the two gadroons with the same pattern 43 is 5 mm. The diameter of the other attachment holes is 6 mm.

Figure 12:
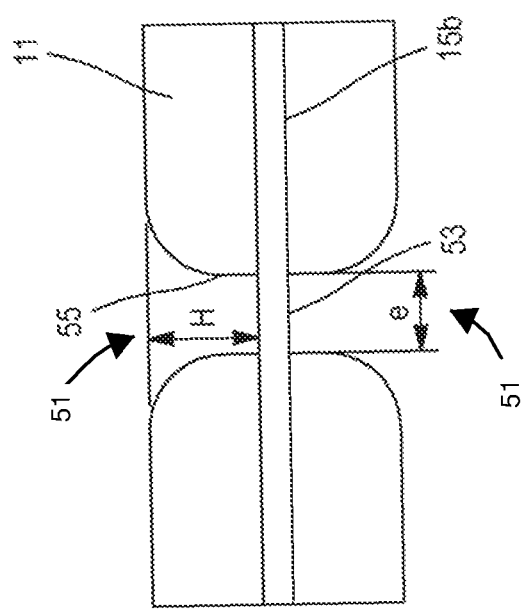
FIG. 12 is a sectional view along XII-XII of FIG. 5.

FIG. 12 shows a sectional view of a notch 51 on the lateral insert 15. The edge 55 of the notch 51 is substantially perpendicular to the overmolded portion 15b of the insert 15. We can understand that the wall of the gadroon 10 corresponding to this edge is substantially perpendicular to this overmolded portion 15b of the insert 15. In this embodiment, two gadroons 10 are present opposite each other on the die 5 and the punch 7, so as to form two notches 51 on each side of the same area 53 of the insert 15.

Figure 13:
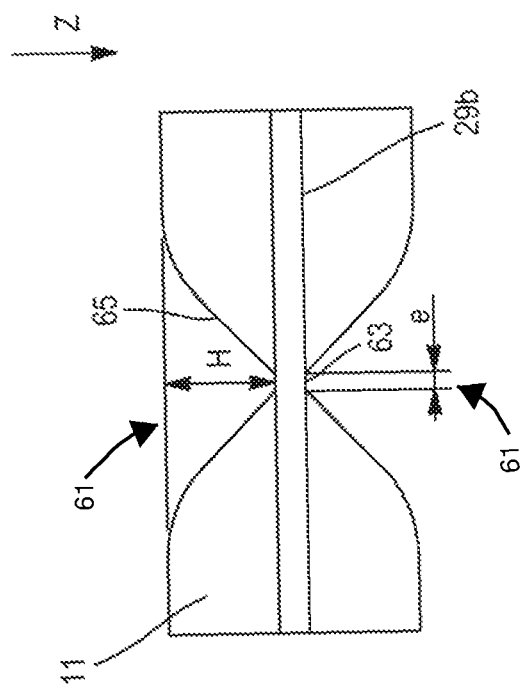
FIG. 13 is a sectional view along XIII-XIII of FIG. 6.

FIG. 13 shows a sectional view of a notch 61 on the rear insert 29. The edge 65 of the notch 61 is inclined relative to the overmolded portion 29b of the insert 29, with an angle of 30° to 87° to facilitate demolding in the Z direction. We can understand that the wall of the gadroon 30 corresponding to this edge is also inclined relative to the Z direction. In this embodiment, two gadroons 30 are also present opposite each other on the die 5 and the punch 7, so as to form two notches 61 on each side of the same area 63 of the insert.

In another embodiment not shown, the gadroons 10 or 30 are arranged offset to each other on the die and the punch.

The invention is not limited to the embodiments described and other embodiments will be clearly apparent to those skilled in the art. In particular, the shape of the gadroons may be different provided that the basic invention remains unchanged.

While the process and method herein described constitute preferred embodiments of this invention, it is to be understood that the invention is not limited to this precise process and method, and that changes may be made therein without departing from the scope of the invention which is defined in the appended claims.

What is claimed is:

1. A mold for producing a floor made from a polymer material for a motor vehicle, comprising at least one metal insert in the form of sheet metal that is partially overmolded such that a portion intended to be covered with a polymer material and a portion intended to not be covered with said polymer material, said mold comprising a die and a punch defining a cavity, said cavity comprising a location intended to receive the portion of said at least one metal insert intended to be covered with polymer material, wherein in said location of said cavity, said mold comprises gadroons on said die and on said punch, said gadroons whose thickness is greater than a predefined minimum thickness (H), wherein another portion of said overmolded at least one metal insert does not extend perpendicularly to a mold closing direction when said overmolded at least one metal insert is situated in said mold, a contact end of at least one of said gadroons of said die or said punch engages said another portion when said mold is closed, said contact end having a substantially trapezoidal shape.

2. The mold according to claim 1, wherein said predefined minimum thickness (H) is greater than or equal to 1 mm.

3. The mold according to claim 1, wherein said gadroons have the same height on said punch and on said die, in order to hold said at least one metal insert in the middle of the plastic material thickness around said at least one metal insert.

4. The mold according to claim 1, wherein each gadroon is dimensioned to come into contact with said at least one metal insert by a free end, after closing said mold, and said free end by which said gadroon comes into contact with said at least one metal insert is shaped to prevent the plastic material from covering said sheet metal at said free end.

5. A mold for producing a floor made from a polymer material for a motor vehicle, comprising at least one metal insert in the form of sheet metal that is partially overmolded such that a portion intended to be covered with a polymer material and a portion intended to not be covered with said polymer material, said mold comprising a die and a punch defining a cavity, said cavity comprising a location intended to receive the portion of said at least one metal insert intended to be covered with polymer material, wherein in said location of said cavity, said mold comprises gadroons on said die and on said punch, said gadroons whose thickness is greater than a predefined minimum thickness (H);

wherein said gadroons are distributed in a repetitive arrangement, for molding under a pressure of 100 bars, with inserts made from sheet steel metal for bodywork of type DC04+ZE according to standard NF EN 10152 (XES quality index according to the former standard NF 36-401), said sheet steel metal thickness being between 0.7 mm and 2 mm, the length of the pattern being comprised between 20 mm and 100 mm.

6. A mold for producing a floor made from a polymer material for a motor vehicle, comprising at least one metal insert in the form of sheet metal that is partially overmolded such that a portion intended to be covered with polymer material and a portion intended to not be covered with said polymer material, said mold comprising a die and a punch defining a cavity, said cavity comprising a location intended to receive said portion of said at least one metal insert intended to be covered with said polymer material, said mold comprising gadroons on said die and on said punch in said location of said cavity, said gadroons having a thickness that is greater than a predefined minimum thickness (H);

wherein when said mold is closed, said gadroons engage said at least one metal insert to create a pattern on a portion of said at least one metal insert that extends in a direction not perpendicular to the mold closing direction, said pattern comprising at least three gadroons, two being close together and a distance between these two close gadroons is from 10 mm to 15 mm.

7. The mold according to claim 1, wherein said gadroons are shaped to facilitate demolding of the floor.

8. The mold according to claim 1, wherein, for a portion of the overmolded metal insert extending parallel to the mold closing direction, the contact end of the gadroon has a substantially trapezoidal shape, with a base of 1 mm to 2 mm and a draft angle of 1 degree to 3 degrees.

9. The mold according to claim 1, wherein, for another portion of the overmolded insert extending not parallel to the mold closing direction, the contact end of the gadroon has a rectangular shape.

10. The mold according to claim 2, wherein said gadroons have the same height on said punch and on said die, in order to hold said at least one metal insert in the middle of the plastic material thickness around said at least one metal insert.

11. The mold according to claim 2, wherein each gadroon is dimensioned to come into contact with said at least one metal insert by a free end, after closing said mold, and said free end by which said gadroon comes into contact with said at least one metal insert is shaped to prevent the plastic material from covering said sheet metal at said free end.

12. The mold according to claim 3, wherein each gadroon is dimensioned to come into contact with said at least one metal insert by a free end, after closing said mold, and said free end by which said gadroon comes into contact with said at least one metal insert is shaped to prevent the plastic material from covering said sheet metal at said free end.

13. The mold according to claim 2, wherein said gadroons are distributed in a repetitive arrangement, for molding under a pressure of 100 bars, with inserts made from sheet steel metal for bodywork of type DC04+ZE according to standard NF EN 10152 (XES quality index according to the former standard NF 36-401), said sheet steel metal thickness being between 0.7 mm and 2 mm, the length of the pattern being comprised between 20 mm and 100 mm.

14. The mold according to claim 2, wherein, on a portion of the overmolded metal insert, which extends in a direction not perpendicular to the mold closing direction, each pattern comprises at least gadroons, two being close together, and a distance between these two close gadroons is from 10 mm to 15 mm.

15. The mold according to claim 2, wherein said gadroons are shaped to facilitate demolding of the floor.

16. The mold according to claim 1, wherein said another portion of said overmolded at least one metal insert that does not extend perpendicularly to the mold closing direction and that is contacted by said contact end of said at least one of said gadroons that has said substantially trapezoidal shape has a base of 1 mm to 2 mm and a draft angle of 1 degree to 3 degrees.

17. A mold for producing a floor made from a polymer material for a motor vehicle, comprising at least one metal insert in the form of sheet metal that is partially overmolded s having a portion intended to be covered with polymer material and a portion intended to not be covered with said polymer material, said mold comprising a die and a punch defining a cavity, said cavity comprising a location intended to receive said portion of said at least one metal insert intended to be covered with said polymer material, said mold comprising gadroons on said die and on said punch in said location of said cavity, said gadroons having a thickness that is greater than a predefined minimum thickness (H);

wherein a contact end of at least one of said gadroons that engages another portion of said at least one metal insert that extends generally perpendicular to a mold closing direction has a rectangular shape.

18. The mold according to claim 1, wherein said predefined minimum thickness (H) is between 2 mm and 4 mm.

19. The mold according to claim 1, wherein said gadroons are distributed in a repetitive arrangement, for molding under a pressure of 100 bars, with inserts made from sheet steel metal for bodywork of type DC04+ZE according to standard NF EN 10152 (XES quality index according to the former standard NF 36-401), said sheet steel metal thickness being between 0.5 mm and 0.8 mm, the length of the pattern being comprised between 20 mm and 55 mm.

20. The mold according to claim 2, wherein said gadroons are distributed in a repetitive arrangement, for molding under a pressure of 100 bars, with inserts made from sheet steel metal for bodywork of type DC04+ZE according to standard NF EN 10152 (XES quality index according to the former standard NF 36-401), said sheet steel metal thickness being between 0.5 mm and 0.8 mm, the length of the pattern being comprised between 20 mm and 55 mm.

* * * * *

UNITED STATES PATENT AND TRADEMARK OFFICE
CERTIFICATE OF CORRECTION

PATENT NO. : 9,855,683 B2  
APPLICATION NO. : 14/655425  
DATED : January 2, 2018  
INVENTOR(S) : Patrick Bosg et al.

Page 1 of 1

It is certified that error appears in the above-identified patent and that said Letters Patent is hereby corrected as shown below:

On the Title Page

Item (73) Assignee, delete "Lyons" and insert -- Lyon -- therefor.

In the Specification

Column 2, Lines 31 through 40, delete paragraph "In order to overcome this additional disadvantage, according to one embodiment of the invention, each gadroon is dimensioned to come into contact with the insert by its free end, after closing the mould, and this free end by which the gadroon comes into contact with the insert is shaped to prevent the plastic material from covering the sheet metal at said end. The quality of this contact depends in particular on the pressure applied by the ends of the gadroons against the inserts, this pressure depending itself directly on the mould closing force and the orientation of the gadroons".

In the Claims

Column 10, Line 51, Claim 14, insert -- three -- after "at least".

Signed and Sealed this  
Fourteenth Day of August, 2018

Andrei Iancu  
*Director of the United States Patent and Trademark Office*